US012763312B2

(12) United States Patent
Wang et al.

(10) Patent No.: US 12,763,312 B2
(45) Date of Patent: Oct. 13, 2026

(54) AUTOMATED FOLDING CALENDER FOR ELECTRODE MANUFACTURING

(71) Applicant: GM Global Technology Operations LLC, Detroit, MI (US)

(72) Inventors: Ming Wang, Sterling Heights, MI (US); Dewen Kong, Shanghai (CN); Yong Lu, Shanghai (CN); Xiaowei Yu, Farmington Hills, MI (US); Jennifer Therese Bracey, Holly, MI (US); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 58 days.

(21) Appl. No.: 18/751,928

(22) Filed: Jun. 24, 2024

(65) Prior Publication Data

US 2025/0385241 A1 Dec. 18, 2025

(30) Foreign Application Priority Data

Jun. 18, 2024 (CN) ......................... 202410788442.0

(51) Int. Cl.
*H01M 4/04* (2006.01)
*B29C 43/46* (2006.01)

(52) U.S. Cl.
CPC ....... *H01M 4/0435* (2013.01); *H01M 4/0483* (2013.01); *B29C 43/46* (2013.01)

(58) Field of Classification Search
CPC .... B29C 43/46; H01M 4/0435; H01M 4/0483
See application file for complete search history.

(56) References Cited

U.S. PATENT DOCUMENTS

| | | | | |
|---|---|---|---|---|
| 5,030,312 A * | 7/1991 | Williams | ................ | H01M 4/04 156/266 |
| 11,462,724 B1 * | 10/2022 | Gordon | ................... | H01M 4/48 |

FOREIGN PATENT DOCUMENTS

| | | |
|---|---|---|
| CN | 111716616 A | 9/2020 |
| DE | 68905034 T2 | 7/1993 |
| WO | 2014175756 A1 | 10/2014 |

* cited by examiner

*Primary Examiner* — Larry W Thrower
(74) *Attorney, Agent, or Firm* — Vivacqua Crane, PLLC

(57) ABSTRACT

A method for manufacturing an electrode includes feeding an electrode mixture to a first conveyor belt. The electrode mixture includes electrode active materials, conductive carbons and polymeric binders. The first conveyor belt moves the electrode mixture film along a first belt-moving direction. The method further includes transferring the electrode mixture film from the first conveyor belt to a second conveyor belt. The second conveyor belt moves the electrode mixture film along a second longitudinal direction. The first belt-moving direction is oblique angled relative to the second longitudinal direction. The side rollers on the second conveyor fold the electrode mixture film at a certain angle with the support of a pair of guide rollers. The method includes hot pressing the electrode mixture film using at least one hot roller to fiberize the PTFE binder along the second belt-moving direction.

13 Claims, 4 Drawing Sheets

AUTOMATED FOLDING CALENDER FOR ELECTRODE MANUFACTURING

INTRODUCTION

The present disclosure generally relates to electrode manufacturing and, more specifically, to an automated folding calender for electrode manufacturing.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A n-methyl pyrrolidone (NMP)-free manufacturing process for making electrode that uses manufacturing-friendly alcohol as a processing solvent media requires a series of repeated hot pressing and folding steps to fiberize polytetrafluoroethylene (PTFE) binders inside the electrode active material. However, this process operates on a batch-to-batch design, posing challenges to efficiency and scalability. It is therefore desirable to maximize the efficiency of this manufacturing process.

SUMMARY

A method for manufacturing an electrode includes feeding an electrode mixture to a first conveyor belt. The electrode mixture includes an electrode active material, conductive carbons and a polymeric binder. The first conveyor belt moves the electrode mixture along a first belt-moving direction. The method also includes transferring the electrode mixture from the first conveyor belt to a second conveyor belt. The second conveyor belt moves the electrode mixture along a second longitudinal direction. The first belt-moving direction is oblique angled relative to the second longitudinal direction. A pair of side rollers on the second conveyor fold the electrode mixture at predetermined oblique angle when the electrode mixture film is transferred from the first conveyor belt to the second conveyor belt, with the support of a pair of guide rollers. The distance between the pair of side rollers on the second conveyor belt, a diameter of each of the pair of guide rollers, and a position of the pair guide rollers control a width of folded electrode mixture film. The method also includes hot pressing the electrode mixture using at least one hot roller to fiberize the polytetrafluoroethylene (PTFE) binder along the second belt-moving direction after transferring the electrode mixture from the first conveyor belt to the second conveyor belt.

In some aspect of the present disclosure, the electrode mixture is free of n-methyl pyrrolidone (NMP). The polymeric binder is a polytetrafluoroethylene (PTFE) binder. The method may include feeding the electrode mixture into a hopper before feeding the electrode mixture to the first conveyor belt. The method may include calendering the electrode mixture after feeding the electrode mixture to the hopper and before feeding the electrode mixture to the first conveyor belt. Hot rollers may be used to calender the electrode mixture. The method may include trimming the electrode mixture exciting the hopper using scrappers. The scrapers are coupled to the hot roller (which are located upstream of the first conveyor belt).

The present disclosure also describes a manufacturing assembly for making an electrode. The manufacturing assembly includes a first conveyor belt configured to move an electrode mixture along a first belt-moving direction. The electrode mixture includes electrode active materials, conductive carbons and polymeric binders. The assembly also includes a second conveyor belt positioned to directly receive the electrode mixture from the first conveyor belt. The second conveyor belt is configured to move the electrode mixture along a second longitudinal direction. The first belt-moving direction is oblique angled relative to the second longitudinal direction to fold the electrode mixture when the electrode mixture is transferred from the first conveyor belt to the second conveyor belt. The assembly also includes one or more hot rollers positioned to hot press the electrode mixture moving with the second conveyor belt along the second belt-moving direction.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 6 is a schematic top view of a manufacturing assembly including a feeder and a plurality of automated folding and calendering units of FIG. 3 stacked together vertically.

DETAILED DESCRIPTION

Figure 1:
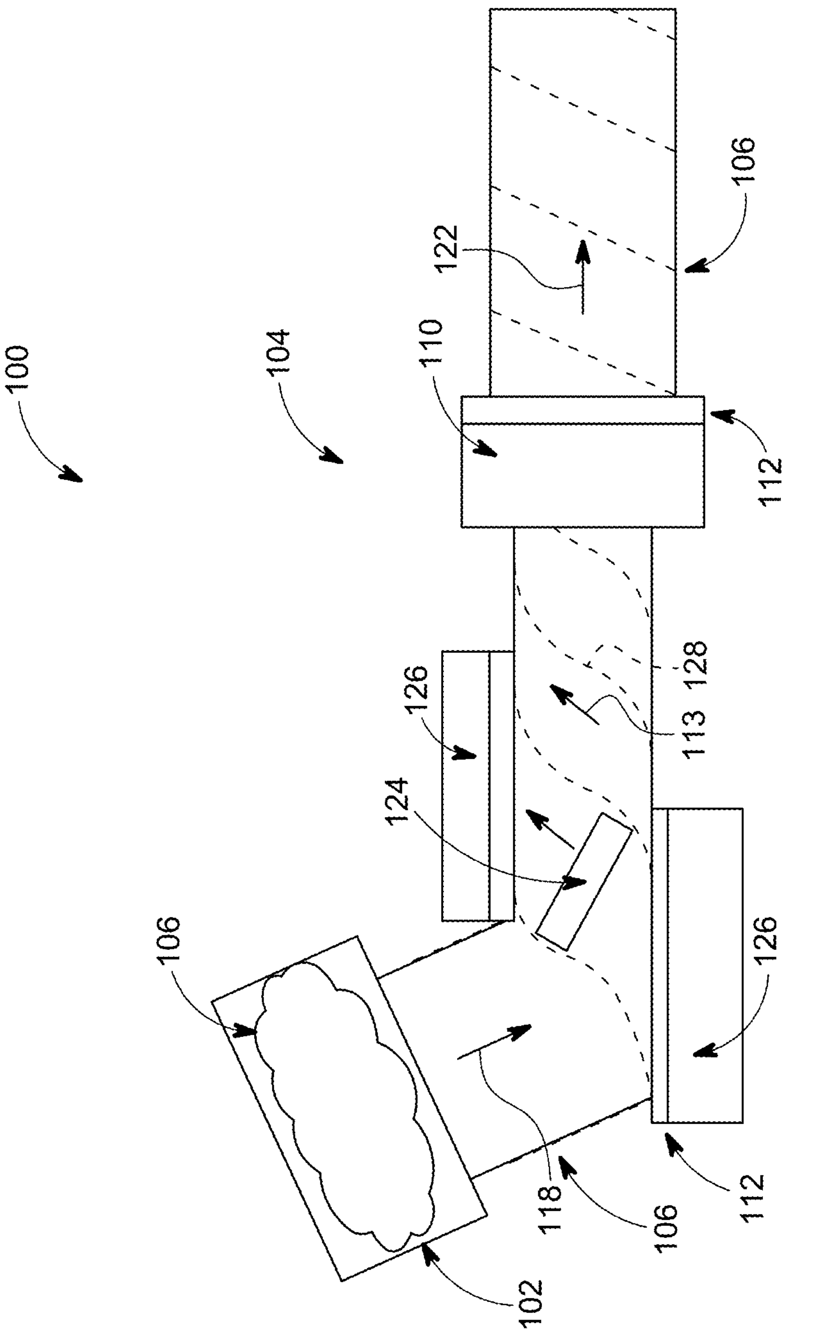
FIG. 1 is a schematic top view of an automated folding calender manufacturing assembly.

Reference will now be made in detail to several examples of the disclosure that are illustrated in accompanying drawings. Whenever possible, the same or similar reference numerals are used in the drawings and the description to refer to the same or like parts or steps.

Figure 3:
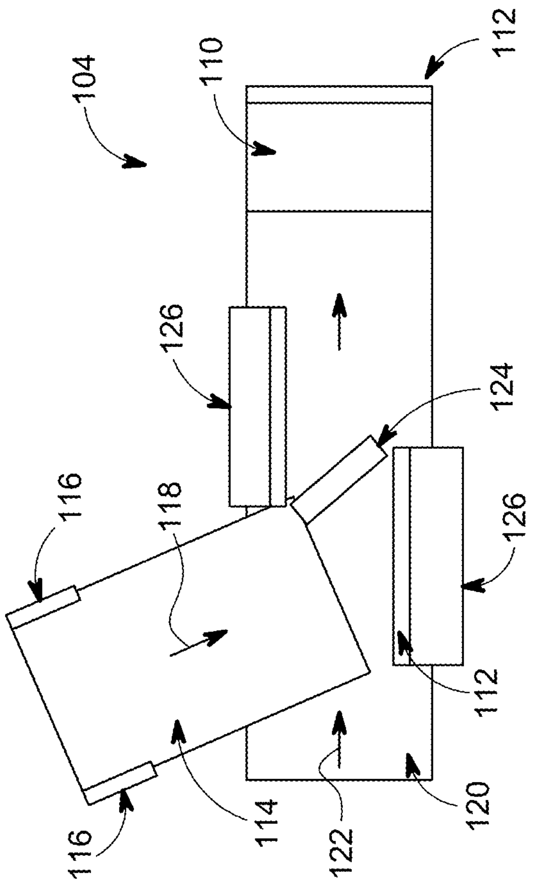
FIG. 3 is a schematic top view of an automated folding and calendering unit of the automated folding calender manufacturing assembly of FIG. 1.
Figure 2:
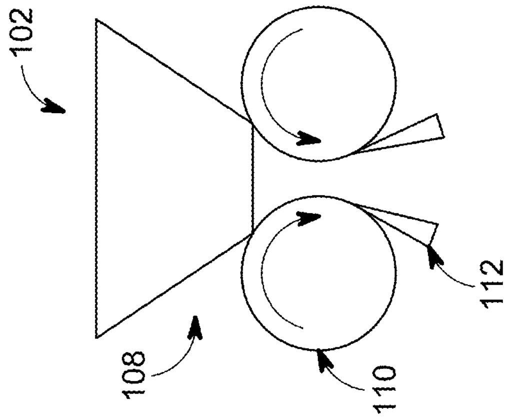
FIG. 2 is a schematic side view of a feeder of the automated folding calender manufacturing assembly of FIG. 1.

FIGS. 1-3 show an automated folding calender manufacturing assembly 100 for making electrodes for batteries. The manufacturing assembly 100 is capable of roll-to-roll multi-directional calendering of electrode films, thereby improving the production efficiency of electrodes. In the depicted embodiment, the manufacturing assembly 100 includes a feeder 102 and an automated folding and calendering unit 104. Electrode mixture 106 is fed into the feeder 102. The feeder 102 is located upstream of the automated folding and calendering unit 104 and is configured to feed the electrode mixture 106 to the automated folding and calendering unit 104. The electrode mixture 106 includes electrode active materials, conductive carbons and polymeric binders. The electrode mixture may be free of N-methyl pyrrolidone (NMP) to minimize environmental impact. The polymeric binder may contain, for example, a polytetrafluoroethylene (PTFE) binder to enhance the strength of the electrode mixture. In the present disclosure, the term "electrode active materials" means cathode materials, anode materials, and/or electrochemically active materials, including solvents, additives, solid state electrolytes and electrolyte salts that contribute to the electrochemical processes necessary for energy storage.

With reference to FIG. 2, the feeder 102 includes a hopper 108, one or more hot rollers 110 downstream of the hopper 108, and one or more scrapers 112. The hopper 108 is configured to receive the electrode mixture 106 and guide it toward the hot rollers 110. The hot rollers 110 are configured to roll to press the electrode mixture 106 and are maintained at a temperature between room temperature (i.e., twenty degrees Celsius) and two hundred degrees Celsius to facilitate calendering the electrode mixture 106. The hot rollers 110 are used to calender the electrode mixture 106 and convert it into an electrode mixture film 106. The speed offset of the hot rollers 110 may be adjusted from 0% to 100%. After this hot pressing by the hot rollers 110, the electrode mixture 106 may be characterized as an electrode film. The scrapers 112 located downstream of the hot rollers 110 to trim the electrode mixture exciting the hopper 108. The scrapers 112 can be used to peel off the electrode film from the hot rollers 110 and clean the material left over.

With reference to FIGS. 1 and 3, the automated folding and calendering unit 104 is positioned to receive the electrode mixture 106 exiting from the feeder 102. In other words, the automated folding and calendering unit 104 is downstream of the feeder 102. The automated folding and calendering unit 104 includes a first conveyor belt 114 and one or more edge trimmers 116 coupled to the first conveyor belt 114. The first conveyor belt 114 is configured to move the electrode mixture 106 along a first belt-moving direction 118. The edge trimmers 116 are configured to trim the edges of the electrode mixture 106 moved by the first conveyor belt 114.

Figure 4:
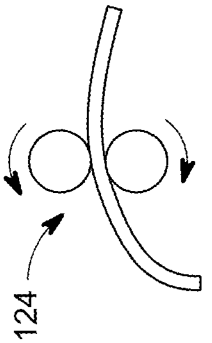
FIG. 4 is a schematic side view of guide rollers of the automated folding and calendering unit of FIG. 3.

With reference to FIGS. 1, 3, and 4, the automated folding and calendering unit 104 includes a second conveyor belt 120 positioned downstream of the first conveyor belt 114. Accordingly, the second conveyor belt 120 is positioned to receive the electrode mixture film 106 exiting the first conveyor belt 114. The second conveyor belt 120 is configured to move the electrode mixture film 106 along a second belt-moving direction 122. The second belt-moving direction 122 is obliquely angled relative to the first belt-moving direction 118. The pair of side rollers 126 on the second conveyor 122 fold the electrode mixture film 106 at predetermined oblique angle when the electrode mixture film is transferred from the first conveyor belt 114 to the second conveyor belt 122, with the support of the pair of guide rollers 124. The distance between the pair of side rollers 126 on the second conveyor belt 120, the diameter and the position of each of the pair of control the width of folded electrode mixture film 106. FIG. 1 shows the folding direction 113. The automated folding and calendering unit 104 includes one or more guide rollers 124 along the second conveyor belt 120 to facilitate folding the electrode mixture 106. Further, the automated folding and calendering unit 104 includes one or more side rollers 126 positioned along the edges of the second conveyor belt 120 to facilitate folding the electrode mixture 106. One or more scrapers 112 may be coupled to the side rollers 126 to trim excess electrode mixture 106 moved by the second conveyor belt 120. The automated folding and calendering unit 104 further includes one or more hot rollers 110 downstream of the side rollers 126 and the guide rollers 124. These hot rollers 110 are positioned to hot press the electrode mixture film 106 moved by the second conveyor belt 120, thereby fiberizing the PTFE binders along the second belt-moving direction 122. The hot rollers 110 are used to calender the electrode mixture 106. One or more scraper 112 may be positioned downstream of these hot rollers 110 to trim the excess electrode mixture film 106. The hot rollers 110 are configured to roll to press the electrode mixture film 106 and are maintained at a temperature between room temperature (i.e., twenty degrees Celsius) and two hundred degrees Celsius to facilitate calendering the electrode mixture 106. In FIG. 2, the dashed lines 128 represent the edges of the electrode film (i.e., the electrode mixture 106 after being hot pressed by the hot rollers 110 coupled to the hopper 108).

Figure 5:
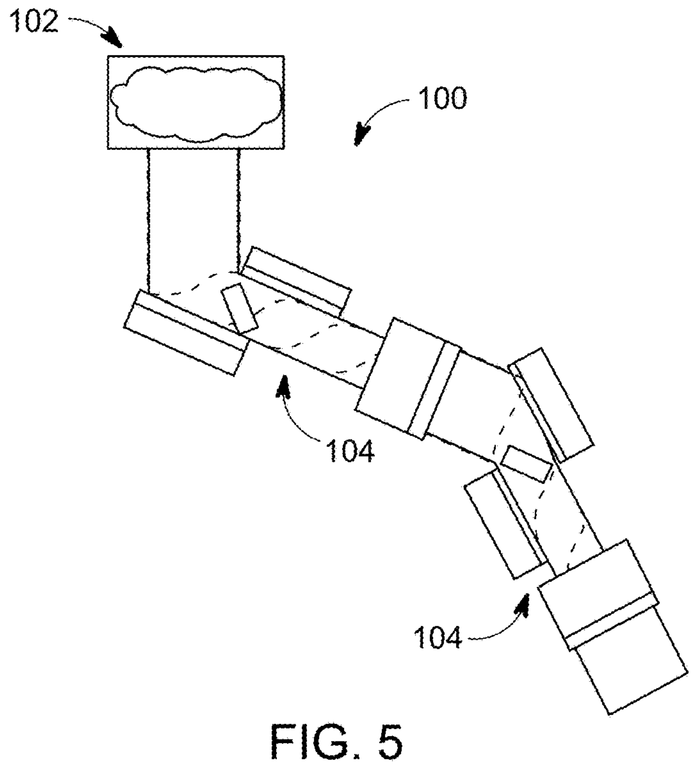

With reference to FIG. 5, the manufacturing assembly 10 may include a feeder 102 and a plurality of automated folding and calendering units 104 arranged in series (i.e., in line).

Figure 6:
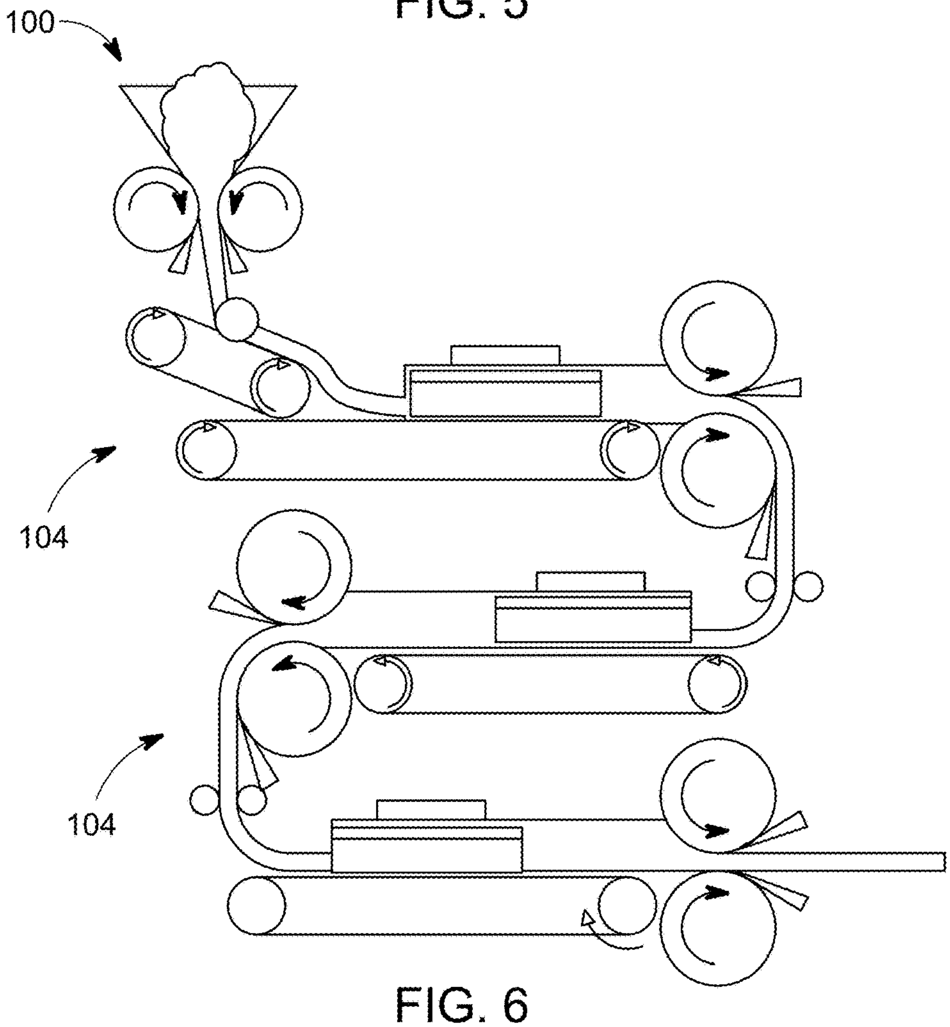
FIG. 6 is a schematic top view of a manufacturing assembly including a feeder and a plurality of automated folding and calendering units of FIG. 3 arranged in series.

With reference to FIG. 6, the manufacturing assembly 100 may include a feeder 102 and a plurality of automated folding and calendering units 104 stacked together vertically, thereby reducing equipment footprint.

Figure 7:
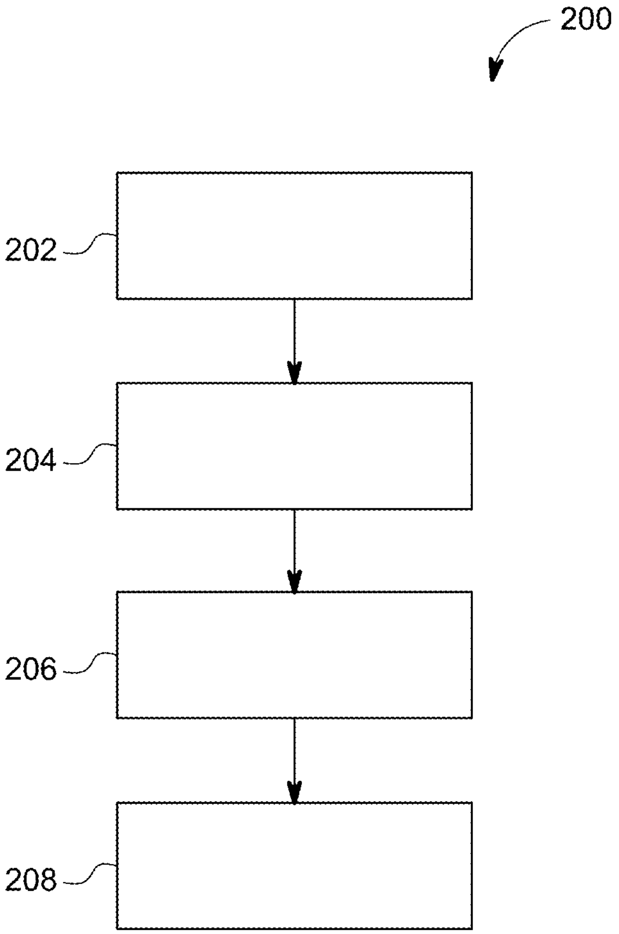
FIG. 7 is a flowchart of a method for manufacturing an electrode using the automated folding calender manufacturing assembly of FIG. 1

FIG. 7 is a method 200 for manufacturing an electrode of a battery. The method 200 begins at block 202. The manufacturing method 200 can be applied to solvent-free mixed dough (i.e., electrode mixture 106), with the option to apply trace amounts of solvents to the film before hot calendering to enhance the cohesion and formability of the folded film. The solvent may be alcohol, esters, glycol, or their blends. At block 202, the electrode mixture 106 is fed into the hopper 108. Then, the method 200 continues to block 204. At block 204, the electrode mixture 106 is calender into a thick film by the hot rollers 110. Excessive material may be trimmed by the scrapers 112. Then, the method 200 continues to block 206. At block 206, the electrode mixture thick film is folded at a predetermined oblique angle by the side rollers 126 with the support of the guide rollers 124 when the electrode mixture film 106 is transferred from the first conveyor belt 114 to the second conveyor belt 120. Specifically, the electrode mixture film 106 is rolled by the side rollers 126 and the guide rollers 124. The guide rollers 124 are adjustable and are used to support the top surface of the electrode film. Further, the distance between the pair of side rollers 126 on the second conveyor belt 120 and the diameter and the position of each of the pair of control the width of folded electrode mixture film 106. Then, the method 200 continues to block 208. At block 208, the electrode mixture film 106 is hot calendered by the hot rollers 110 located on the second conveyor belt 120 to form a new electrode film. The hot rollers 110 also helps fiberize the polymeric binders (e.g., PTFE binders) along the second belt-moving direction 122 and a transverse direction transverse to the second-belt moving direction 122. Blocks 204, 206, and 208 are repeated as needed until a dense, strong film with the desired PTFE fibrillation degree is obtained.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for manufacturing an electrode, comprising;

feeding an electrode mixture film to a first conveyor belt, wherein the electrode mixture includes electrode active materials, conductive carbons and polymeric binders, and the first conveyor belt moves the electrode mixture along a first belt-moving direction;

transferring the electrode mixture film from the first conveyor belt to a second conveyor belt, wherein the second conveyor belt moves the electrode mixture along a second belt-moving direction, the first belt-moving direction is oblique angled relative to the second belt-moving direction, a pair of side rollers on the second conveyor belt fold the electrode mixture at a predetermined oblique angle when the electrode mixture film is transferred from the first conveyor belt to the second conveyor belt, with the support of a pair of guide rollers which contact a top surface of the folded electrode mixture, and a distance between the pair of side rollers on the second conveyor belt, a diameter of each of the pair of guide rollers, and a position of the pair of guide rollers control a width of folded electrode mixture film; and after folding the electrode film, hot pressing the electrode mixture using at least one hot roller to fiberize the polymeric binder along the second belt-moving direction.

2. The method of claim 1, wherein the electrode mixture is free of N-methyl pyrrolidone (NMP).

3. The method of claim 2, wherein the polymeric binders includes a polytetrafluoroethylene (PTFE) binder.

4. The method of claim 2, further comprising feeding the electrode mixture into a hopper before feeding the electrode mixture to the first conveyor belt.

5. The method of claim 4, further comprising calendering the electrode mixture to mixture film after feeding the electrode mixture to the hopper and before feeding the electrode mixture to the first conveyor belt.

6. The method of claim 5, wherein the at least one hot roller is a first hot roller, and using at least a second roller to calender the electrode mixture.

7. The method of claim 6, further comprising trimming the electrode mixture exiting the hopper.

8. A method for manufacturing an electrode, comprising;

feeding an electrode mixture to a first conveyor belt, wherein the electrode mixture includes electrode active materials, conductive carbons and polymeric binders, the first conveyor belt moves the electrode mixture along a first belt-moving direction, and the electrode mixture is free of N-methyl pyrrolidone (NMP), and the polymeric binders includes a polytetrafluoroethylene (PTFE) binder;

transferring the electrode mixture film from the first conveyor belt to a second conveyor belt, wherein the second conveyor belt moves the electrode mixture along a second longitudinal direction, the first belt-moving direction is oblique angled relative to the second longitudinal direction, wherein a pair of side rollers on the second conveyor belt fold the electrode mixture at a predetermined oblique angle when the electrode mixture film is transferred from the first conveyor belt to the second conveyor belt, with the support of a pair of guide rollers which contact a top surface of the folded electrode mixture, wherein a distance between the pair of side rollers on the second conveyor belt, the diameter of the pair of guide rollers and position of the guide rollers control a width of folded electrode mixture film;

after folding, hot pressing the folded electrode mixture film to fiberize the PTFE binder along the second belt-moving direction.

9. The method of claim 8, further comprising using at least one hot roller to hot press the electrode mixture.

10. The method of claim 9, further comprising feeding the electrode mixture into a hopper before feeding the electrode mixture to the first conveyor belt.

11. The method of claim 10, further comprising calendering the electrode mixture after feeding the electrode mixture to the hopper and before feeding the electrode mixture to the first conveyor belt.

12. The method of claim 11, wherein the at least one hot roller is a first hot roller, and using at least a second roller to calender the electrode mixture.

13. The method of claim 12, further comprising trimming the electrode mixture exiting the hopper.

* * * * *